United States Patent [19]

Windisch et al.

[11] Patent Number: 6,093,674
[45] Date of Patent: Jul. 25, 2000

[54] SUPPORTED COBALT CATALYST, PRODUCTION THEREOF AND USE THEREOF FOR THE POLYMERIZATION OF UNSATURATED COMPOUNDS

[75] Inventors: Heike Windisch, Bergisch Gladbach; Gerd Sylvester, Leverkusen, both of Germany

[73] Assignee: Bayer AG, Germany

[21] Appl. No.: 09/132,370

[22] Filed: Aug. 11, 1998

[30] Foreign Application Priority Data

Aug. 18, 1997 [DE] Germany ............... 197 35 794

[51] Int. Cl.$^7$ ............................................. B01J 31/00
[52] U.S. Cl. ............... 502/154; 502/150; 502/151; 502/152; 502/153; 502/155; 502/156; 502/159; 502/162; 502/171
[58] Field of Search .................... 502/150, 151, 502/152, 153, 154, 155, 156, 159, 162, 171

[56] References Cited

U.S. PATENT DOCUMENTS

| | | | |
|---|---|---|---|
| 3,917,737 | 11/1975 | Yoo | 502/152 |
| 4,737,480 | 4/1988 | Frame et al. | 502/117 |
| 5,037,788 | 8/1991 | Frame | 502/117 |
| 5,879,805 | 3/1999 | Brady et al. | 428/407 |

FOREIGN PATENT DOCUMENTS

| | | |
|---|---|---|
| 0 727 447 | 8/1996 | European Pat. Off. |
| 43 34 045 | 4/1995 | Germany. |
| 1158296 | 7/1969 | United Kingdom. |
| 1390 530 | 4/1975 | United Kingdom. |
| WO 96/04322 | 2/1996 | WIPO. |
| WO 96/04323 | 2/1996 | WIPO. |
| WO 96/31543 | 10/1996 | WIPO. |
| WO 96/31544 | 10/1996 | WIPO. |
| WO 97/08211 | 3/1997 | WIPO. |

OTHER PUBLICATIONS

Orbit Abstract of EP 0 727 447 (08/21/96).
Orbit Abstract of DE 43 34 045 (04/13/1995).
Orbit Abstract of WO 96/31543 (10/10/96).
Orbit Abstract of WO 96/31544 (10/10/96).
Derwent Abstract (XP 002083196), JP 57180614 (Japan, Nov. 6, 1982).
European Search Report for foreign counterpart application No. EP 98 11 4700 (Nov. 16, 1998).
English Translation of JP 57,180,614 (Japan, Nov. 6, 1982).

*Primary Examiner*—Elizabeth D. Wood
*Attorney, Agent, or Firm*—Connolly Bove Lodge & Hutz LLP

[57] ABSTRACT

The present invention relates to a supported cobalt catalyst consisting of
   (a) cobalt compounds,
   (b) organoaluminium compounds,
   (c) water or OH-acidic compounds,
   (d) inorganic or polymeric organic support materials and
   (e) modifiers selected from the group comprising tertiary phosphines,
to the production thereof and to the use thereof for the polymerization of unsaturated compounds, in particular of conjugated dienes, in the gas phase. With the assistance of the catalysts according to the invention, it is possible to achieve gas phase polymerization of conjugated dienes with an elevated content of lateral double bonds in the polymers.

18 Claims, No Drawings

SUPPORTED COBALT CATALYST, PRODUCTION THEREOF AND USE THEREOF FOR THE POLYMERIZATION OF UNSATURATED COMPOUNDS

This invention relates to a novel supported cobalt catalyst, to the production thereof and to the use thereof for the polymerisation of unsaturated compounds, in particular of conjugated dienes, in the gas phase.

The polymerisation of unsaturated compounds, for example conjugated dienes, in solution has the disadvantages that, during separation of the unreacted monomers and solvent from the resultant polymer, low molecular weight compounds may pass into the environment via the waste air and waste water and must consequently be disposed of. Moreover, large quantities of solvents must also be used and then separated from the resultant polymers, with considerable energy input, which reduces the economic viability of the polymerisation process. The solvents are furthermore generally combustible and highly flammable and thus constitute an additional potential hazard during polymerisation.

In recent years, the gas phase process has proved particularly advantageous in particular for the production of polyethylene and polypropylene, and has become increasingly widely used industrially. The advantages of the gas phase process are in particular based on the fact that no solvents are used and emissions and waste water contamination may be reduced.

Due to the advantages of the gas phase process, efforts have been made in recent years to use gas phase polymerisation processes with conjugated dienes too. Thus, for example, novel catalyst systems have been developed for the polymerisation of conjugated dienes, in particular butadiene, which have proved suitable in gas phase polymerisation (c.f. for example DE-A 43 34 045, EP 727 447, WO 96/31543, WO 96/31544, WO 96/04323, WO 96/04322 and WO 97/08211).

When used for the polymerisation of conjugated dienes in the gas phase, the catalysts described in the above-stated patent publications give rise to an elevated content of 1,4-cis double bonds in the polymers. According to the patent literature, the cobalt catalysts, but also to a less significant extent the nickel and titanium catalysts, used in gas phase polymerisation, unlike the rare earth metals, are used together with a solvent, wherein either the entire catalyst or only the co-catalyst is added in dissolved form in a solvent. As a result, in the case of continuous operation, solvent may accumulate undesirably in the circulating gas. The solvent must then be removed from the circulating gas so that it does not accumulate. Furthermore, the cobalt catalysts are not present in the catalyst system at a defined ratio, such that apportionment of the co-catalyst into the reaction chamber does not result in optimum utilisation of the co-catalyst, which is economically disadvantageous. The solvent must moreover be removed from the polymer, so complicating the process.

The aim of the present invention is to provide novel supported cobalt catalysts for the gas phase polymerisation of conjugated dienes which, in addition to cis polymerisation of conjugated dienes, also allow the production of polymers in the gas phase having an elevated and freely adjustable content of 1,2 units and which catalysts may be used without the addition of solvents.

This aim is achieved by using supported catalysts containing cobalt compounds of specific modifiers for polymerisation of conjugated dienes.

The present invention accordingly provides supported cobalt catalysts consisting of (a) cobalt compounds,
(b) organoaluminium compounds,
(c) water or OH-acidic compounds,
(d) inorganic or polymeric organic support materials and
(e) modifiers selected from the group comprising tertiary phosphines, wherein the molar ratio of components (a):(b):(e) is within the range from 1:10 to 1000:0.1 to 100, the molar ratio of components (b):(c) is within the range from 1:0.1 to 0.9 and 0.01 to 100 mmol of component (a) are used per 100 g of component (d).

The molar ratio of components (a):(b):(e) is preferably 1:10 to 500:0.5 to 50, the molar ratio of component (b):(c) is 1:0.2 to 0.8 and 0.1 to 50 mmol of component (a) are used per 100 g of component (d).

Cobalt compounds (component (a)) which may be considered are in particular those selected from the group consisting of I β-diketonates of cobalt,
II β-keto acid complexes of cobalt,
III cobalt salts of organic acids having 6 to 15 carbon atoms,
IV complexes of halogenated cobalt compounds of the formula $CoX_aD_b$, wherein X denotes a halogen atom, a means the numbers 2 or 3, D is an organic compound selected from the group consisting of tertiary amines, alcohols, tertiary phosphines, ketones and N,N-dialkylamides and b means a number from 0 to 6, together with
V organometallic complexes of cobalt with π-bonded anions.

Component (b) organoaluminium compounds which may in particular be considered are organoaluminium compounds of the formula $X_cAlR_d$, wherein X denotes a halogen, R denotes an organic alkyl group having 1 to 12 carbon atoms, c and d mean the numbers 1 to 2, wherein the sum of c and d is the number 3.

Cobalt compounds (component (a)) which are soluble in inert organic solvents and may be used are, for example:

(I) β-diketonates of cobalt with β-diketonates of the formula $R^1$—CO—$CR^2$—CO—$R^3$, wherein $R^1$ to $R^3$ may be identical or different and denote hydrogen or an alkyl group having 1 to 10 C atoms, for example Co(Me—CO—CH—CO—Me)$_2$ and Co(Me—CO—CH—CO—Me)$_3$;

(II) β-keto acid complexes of cobalt with keto acid esters of the formula $R^1$—CO—$CR^2$—CO—O—$R^3$, wherein $R^1$ to $R^3$ may be identical or different and denote hydrogen or an alkyl group having 1 to 10 C atoms, for example Co(Me—CO—CH—CO—O—Me)$_2$, Co(Me—CO—CH—CO—O—Et)$_2$, Co(Me—CO—CH—CO—O—Me)$_3$ and Co(Me—CO—CH—CO—O—Et)$_3$;

(III) cobalt salts of organic acids having 6 to 15 carbon atoms, for example Co(octanoate)$_2$, Co(versatate)$_2$;

(IV) complexes of halogenated cobalt compounds of the formula $CoX_eD_f$, wherein X denotes a halogen atom, e means the numbers 2 or 3, D is an organic compound selected from the group consisting of tertiary amines, alcohols, tertiary phosphines, ketones and N,N-dialkylamides and f means a number from 0 to 6, for example $CoCl_2$-(pyridine)$_2$, $CoBr_2$-(pyridine)$_2$, $CoCl_2$—(PPh$_3$)$_2$, $CoBr_2$—(PPh$_3$)$_2$, $CoCl_2$-(vinylimidazole)$_4$, $CoCl_2$—(EtOH);

(V) organometallic complexes having π-bonded anions, for example tris-(π-allyl)cobalt, bis-(π-allyl)cobalt chloride, bis-(π-allyl)cobalt bromide, bis-(π-allyl) cobalt iodide, biscrylonitrile-(π-allyl)cobalt, (1,3-butadiene)[1-(2-methyl-3-butenyl)-π-allyl]cobalt, bis-(π-1,5-cyclooctadienyl)-tert.-butyl-isonitrile)cobalt, (π-cyclooctenyl)-(π-1,5-cyclooctadienyl)cobalt, (π-cycloheptadienyl)-(π-1,5-cyclooctadienyl)cobalt, (bicyclo[3.3.0]-octadienyl)-(π-1,5-cyclooctadienyl) cobalt.

Component (b) organoaluminium compounds which may in particular be used are:

diethylaluminium chloride, ethylaluminium sesquichloride, ethylaluminium dibromide, diethylaluminium bromide, ethylaluminium diiodide, diethylaluminium iodide, diisobutylaluminium chloride, octylaluminium dichloride, dioctylaluminium chloride.

In addition to water, other OH-acidic compounds, such as for example alcohols and oxide support materials having OH groups on the surface of the support, are suitable as component (c). Support materials based on silicon dioxide and aluminium oxide may be mentioned by way of example.

Support materials (component (d)) which are used are particulate, inorganic solids or particulate, polymeric organic solids having a specific surface area of >10, preferably of 10 to 1000 $m^2/g$ (BET) and a pore volume of 0.3 to 15, preferably of 0.5 to 12 ml/g, which are inert during the polymerisation reaction.

The specific surface area (BET) is determined in the conventional manner [c.f. for example S. Brunauer, P. H. Emmett and Teller, *J. Amer. Chem. Soc.* 60 (2) (1938) 309], while pore volume is determined by the centrifugation method [M. McDaniel, *J. Colloid Interface Sci.* 78 (1990) 31].

Suitable inorganic solids are in particular silica gels, clays, aluminosilicates, talcum, zeolites, carbon black, graphite, activated carbon, inorganic oxides, such as for example silicon dioxide, aluminium oxide, magnesium oxide and titanium dioxide, inorganic salts, such as for example aluminium fluoride, as well as silicon carbide, preferably silica gels, zeolites, magnesium chloride and carbon black. Organic support materials are also suitable, such as for example polyethylene, polypropylene, polystyrene or polybutadiene.

The stated inorganic solids, which comply with the above-stated specification and are accordingly suitable for use are described in greater detail in, for example, *Ullmanns Enzyklopädie der technischen Chemie*, volume 21, pp. 439 et seq. (silica gels), volume 23, pp. 311 et seq. (clays), volume 14, pp. 633 et seq. (carbon blacks), volume 24, pp. 575 et seq. and volume 17, pp. 9 et seq. (zeolites).

The inorganic and organic polymeric solids may be used individually or mixed together. As already mentioned, 0.01 to 100 mmol of component (a), preferably 0.1 to 50 mmol of component (a) are used per 100 g of support material.

It is, of course, also possible to heterogenise the catalyst onto non-porous, particulate solids, such as glass beads or glass rings, or onto the surface of the reaction vessels, such as for example glass bottles or flasks.

Modifiers (component (e)) which may in particular be considered are those tertiary phosphines of the formula $P(3-R^1-,4-R^2-,5-R^3—C_6H_2)_3$, in which $R^1$ to $R^3$ are identical or different and denote hydrogen or an alkyl group having 1 to 6 C atoms, for example $P(C_6H_5)_3, P(4-Me—C_6H_4)_3, P(3,5-Me_2—C_6H_3)_3$. The figures 3, 4 and 5 in the general formula for the phosphines denote the substitution position of the aromatic residue.

It should be noted in this connection that the component (a) cobalt compounds and the component (b) organoaluminium compounds may be used both individually and mixed with each other. The most favourable mixture ratio may readily be determined by appropriate preliminary testing.

The present invention also provides a process for the production of the supported cobalt catalysts consisting of (a) cobalt compounds, (b) organoaluminium compounds, (c) water or OH-acidic compounds, (d) inorganic or polymeric organic support materials, (e) modifiers selected from the group comprising tertiary phosphines, which process is characterised in that components (a) to (e) are reacted together in an inert solvent and/or diluent at temperatures of −80 to 100° C. in a molar ratio of components (a):(b):(e) within the range from 1:10 to 1000:0.1 to 100 a molar ratio of components (b):(c) within the range from 1:0.1 to 0.9 and a ratio of 0.01 to 100 mmol of component (a) per 100 g of component (d) and the inert solvent and/or diluent is subsequently removed at temperatures of −40 to 100° C., optionally under reduced pressure.

Components (a) to (e) are in particular reacted in the above-stated preferred quantity ratio.

The individual components may be combined in any desired order in the process according to the invention.

The components are preferably blended at temperatures of −50 to 80° C., in particular at −40 to 60° C. The temperature range is here between the melting and boiling point of the inert solvent and/or diluent used.

Aliphatic and/or aromatic solvents such as butane, pentane, n-hexane, cyclohexane, benzene, toluene, xylene may in particular be considered as the inert solvent and/or diluent (S/D).

The inert solvents and/or diluents are conventionally used in quantities of 1 to 1000 g, relative to 100 g of support material. The quantity of inert solvents and/or diluents is kept as small as possible on grounds of economy.

The catalysts according to the invention may be produced in various different ways:

The support material may, for example, be suspended in the inert solvent and/or diluent and the components (a), (b), (c) and (e) then added in any desired order. It is also possible to produce a solution of the catalyst components (a), (b), (c) and (e) by adding the components in any desired order to an inert solvent and adding this solution to the support material, which is either suspended in an inert solvent and/or diluent or is in dry form.

The catalyst may also be produced in the presence of a diene, wherein the diene may be identical to or different from the diene which is subsequently polymerised by gas phase polymerisation using this catalyst.

The following order of addition of the components has proved to be a particularly suitable embodiment:

The support material is suspended in the solvent and/or diluent and the components are added in the order (b)-(c)-(a)-(e), wherein the components are added either dissolved in a suitable solvent or without additional solvent.

Another suitable embodiment comprises the following addition of the components:

The support material is suspended in the solvent and/or diluent and the components are added in the order (a)-(c)-(b)-(e), wherein the components are added either dissolved in a suitable solvent or without additional solvent.

As mentioned, the solvents and/or diluents used may be used individually or mixed together, this statement applying to all the components of the catalyst according to the invention. Once the reaction is complete, the solvent and/or diluent is removed by distillation, optionally under a vacuum, wherein the catalyst support is obtained as a free-flowing solid.

The present invention also provides the use of the supported cobalt catalysts according to the invention for the polymerisation of unsaturated compounds, in particular for the gas phase polymerisation of conjugated dienes, preferably of 1,3-butadiene, isoprene, pentadiene and/or dimethylbutadiene. It is also possible to use the catalyst according to the invention for polymerisation in solution or using the slurry process.

Polymerisation is performed using the gas phase process, for example in such a manner that the unsaturated compound is brought into contact with the catalyst according to the invention. The gaseous monomers may here be mixed with further gases for the purposes of dilution or dissipation of heat or to control molecular weight or microstructure.

Polymerisation may be performed at pressures of 1 mbar to 50 bar, preferably of 1 to 20 bar. Polymerisation is generally performed at temperatures of −40 to 150° C., preferably at −20 to 100° C., particularly preferably at 0 to 80° C.

Gas phase polymerisation may be performed in any apparatus suitable for gas phase polymerisation.

It is thus possible, for example, to use a rotary reactor or a fluidised bed reactor or a combination of these reactor types. Gas phase polymerisation may also be performed with the addition of inert dusting agents, such as silica gel or carbon black.

In gas phase polymerisation, the catalyst according to the invention is transferred into an apparatus which is capable of maintaining the pulverulent catalyst in motion. This may be achieved, for example, by stirring, rotation and/or by a stream of gas. The inert gas, for example argon, initially present in the gas space is then replaced by the gaseous monomers. Polymerisation then begins immediately and the temperature rises. The monomer, optionally diluted with an inert gas, is added to the reactor at a rate such that the desired reaction temperature is not exceeded. The reaction temperature may also be established in the conventional manner by heating or cooling. Heat may also be dissipated by introducing liquid substances which vaporise at the reaction temperature. Polymerisation is terminated by shutting off the monomer feed. The polymer may be further treated in such a manner that the catalyst is deactivated and the polymer is treated with conventional quantities of for example, known antioxidants, such as sterically hindered phenols or aromatic amines.

The advantages achieved in the gas phase polymerisation of in particular conjugated dienes with the assistance of the cobalt catalyst according to the invention are in particular that it is possible with the assistance of the cobalt catalyst according to the invention to produce polymers having an elevated content of lateral double bonds, for example polybutadiene having an elevated content of 1,2 double bonds, wherein the content of 1,2-polybutadiene may readily be controlled by appropriate variation of the catalyst. It is furthermore surprising that it is possible by using the catalyst according to the invention to operate without solvent. Solvents have in fact always been required when using prior art cobalt catalysts.

EXAMPLES

In the stated Examples, the supported catalysts were prepared and the gas phase polymerisations performed in an atmosphere of purified argon. The microstructure of the polybutadienes was determined by IR spectroscopy [E. O. Schmalz, W. Kimmer, Z. anal Chem., 181 (1961) 229].

Example 1

4.35 ml of a 1.15 molar solution of DEAC (=5 mmol diethylaluminium chloride) in n-hexane were added at −40° C. to a solution of 45 ml of water (=2.5 mmol) in 5 ml of toluene under argon in a 1 liter glass flask, the solution was heated to 20° C. within 30 minutes while being stirred with a magnetic stirrer and 0.25 ml of a 0.2 molar solution of $Co(oct)_2$ (=0.05 mmol of cobalt(II) octanoate) in toluene and 262 mg of $PPh_3$ (1 mmol) were then added. The solvent was then completely removed by vacuum distillation at room temperature and the resultant catalyst uniformly distributed over the entire wall of the glassware by tilting.

Gas phase polymerisation was performed by completely evacuating the flask and then filling it with gaseous butadiene. The reaction temperature was maintained by a water bath adjusted to 40° C. Butadiene pressure was maintained between 650 and 1050 mbar during polymerisation. The course of polymerisation was determined by means of the pressure profile over time. After 60 minutes, 8.9 g of polybutadiene were obtained. 93% of the polybutadiene could be dissolved in THF and determination of the microstructure revealed a content of 80% 1,2-, 18% 1,4-cis and 2% 1,4-trans-polybutadiene.

Examples 2 to 9

The catalysts were prepared and the gas phase polymerisation performed in accordance with Example 1. Table 1 summarises the batch sizes used for catalyst production, polymerisation conditions and results of the gas phase polymerisation.

TABLE 1

| No. | $Co(oct)_2$ in mmol | DEAC in mmol | $H_2O$ in mmol | $PPh_3$ in mmol | COD in mmol | T in ° C. | t in min | PB in g | 1,2 in % | cis in % | trans in % |
|---|---|---|---|---|---|---|---|---|---|---|---|
| 2 | 0.05 | 5.0 | 2.5 | 0.51 | — | 0 | 100 | 18.5 | 87 | 11 | 2 |
| 3 | 0.05 | 5.0 | 2.5 | 0.5 | 0.5 | 25 | 68 | 8.1 | 81 | 16 | 3 |
| 4 | 0.05 | 5.0 | 2.5 | 0.5 | 0.25 | 25 | 69 | 10.1 | 82 | 15 | 3 |
| 5 | 0.05 | 5.0 | 2.5 | 0.25 | 0.5 | 25 | 64 | 17.7 | 69 | 27 | 4 |
| 6 | 0.42 | 5.0 | 1.0 | 0.42 | — | 25 | 60 | 13.6 | 14 | 73 | 13 |
| 7 | 0.42 | 5.0 | 1.0 | — | — | 25 | 70 | 39.0 | 5 | 76 | 19 |
| 8 | 0.05 | 5.0 | 2.5 | — | — | 40 | 60 | 16.0 | 5 | 84 | 11 |
| 9 | 0.05 | 5.0 | 2.5 | — | — | 40 | 85 | 31.1 | nd | nd | nd | nd = not determined

Example 10

1.9 g of a microporous polypropylene support (Accurel EP100, Akzo Nobel) were suspended in 24 ml of toluene with 0.4 mmol of water at 20° C. in a 250 ml glass flask. 0.095 ml of a 1.78 molar solution of Co(oct)$_2$ in hexane (0.17 mmol), 1.74 ml of a 1.15 molar solution of DEAC in hexane (2.0 mmol) and 10.5 mg of PPh$_3$ (0.04 mmol) were stirred in in succession. After 2 hours, the solvent was removed by vacuum distillation and the supported catalyst obtained as a free-flowing solid.

Gas phase polymerisation was performed by transferring the supported catalyst into a 1 liter glass flask. The flask was completely evacuated and then filled with gaseous butadiene. The reaction temperature was maintained by a water bath adjusted to 50° C. Butadiene pressure was maintained between 650 and 1050 mbar during polymerisation. The course of polymerisation was determined by means of the pressure profile over time. After 30 minutes, 1.0 g of polybutadiene was obtained having a content of 43% 1,2-, 41% 1,4-cis and 16% 1,4-trans-polybutadiene.

Examples 11–15

The catalysts were prepared and the gas phase polymerisation performed in accordance with Example 10, the catalysts being produced without addition of a modifier. Table 2 summarises the batch sizes and reaction conditions used for catalyst production, polymerisation conditions and results of the gas phase polymerisation.

TABLE 2

| | | Catalyst production | | | | | | Gas phase polymerisation | | | | |
|---|---|---|---|---|---|---|---|---|---|---|---|---|
| No. | Support | Toluene in ml | H$_2$O in mmol | DEAC in mmol | Co(oct)$_2$ in mmol | T in °C. | t in min | T in °C. | t in min | PB in g | 1,2 in % | cis in % | trans in % |
| 11 | 1.2 g PP$^{a)}$ | 24 | 0.4 | 2.0 | 0.17 | 20 | 20 | 40 | 60 | 6.5 | 9 | 74 | 17 |
| 12 | 3.2 g PP$^{a)}$ | 35 | 1.5 | 3.8 | 0.32 | −30 | 15 | 25 | 30 | 5.9 | 7 | 81 | 12 |
| 13 | 5.8 g MgCl$_2$ | 10 | 1.0 | 5.0 | 0.42 | −40 | 60 | 25 | 78 | 21.0 | 5 | 80 | 15 |
| 14 | 16.9 g SiO$_2$$^{b)}$ | 50 | — | 92 | 0.92 | 25 | 40 | 25 | 50 | 11.0 | nd | nd | nd |
| 15 | 9.7 g SiO$_2$$^{c)}$ | 45 | — | 11.5 | 0.82 | 25 | 30 | 25 | 70 | 16.0 | nd | nd | nd |

$^{a)}$PP = Accurel EP100; Akzo Nobel
$^{b)}$SiO$_2$ = Sylopol 3325N; Grace; dried for 24 h at 250° C.
$^{c)}$SiO$_2$ = Sylopol 3325N; Grace; dried for 24 h at 800° C.

What is claimed is:

1. A supported heterogenous cobalt catalyst comprising a reaction product of components consisting essentially of:
   (a) a cobalt compound,
   (b) an organoaluminum compound,
   (c) water or an OH-acidic compound,
   (d) an inorganic support and/or a polymeric organic support, and
   (e) a modifier comprising a tertiary phosphine.

2. A process for producing a supported heterogenous cobalt catalyst comprising a reaction product of components consisting essentially of:
   (a) a cobalt compound,
   (b) an organoaluminum compound,
   (c) water or an OH-acidic compound,
   (d) an inorganic support and/or a polymeric organic support, and
   (e) a modifier comprising a tertiary phosphine,
   the process comprising the steps of:
   A) reacting components (a) to (e) together in an inert solvent and/or diluent at a temperature of from −80 to 100° C. in a molar ratio of components (a):(b):(e) within the range of from 1:10 to 1000:0.1 to 100, a molar ratio of components (b):(c) within the range of from 1:0.1 to 0.9, and a ratio of from 0.01 to 100 mmol of component (a) per 100 g of component (d), and
   B) removing the inert solvent and/or diluent at a temperature of from −40 to 100° C., optionally under reduced pressure.

3. The cobalt catalyst according to claim 1, wherein the molar ratio of components (a):(b):(e) is within the range from 1:10 to 500:0.5 to 50, the molar ratio of components (b):(c) is within the range from 1:0.2 to 0.8, and 0.1 to 50 mmol of component (a) are used per 100 g of component (d).

4. The cobalt catalyst according to claim 1, wherein component (a) is selected from the group consisting of;
   I. β-diketonates of cobalt,
   II. β-keto acid complexes of cobalt,
   III. cobalt salts of organic acids having 6 to 15 carbon atoms,
   IV. complexes of halogened cobalt compounds of the formula CoX$_a$D$_b$, where X is a halogen atom, a is 2 or 3, D is an organic compound selected from the group consisting of tertiary amines, alcohols, tertiary phosphines, ketones and N,N-diaklyamides, and b is 0 to 6, and
   V. organometallic complexes of cobalt having π-bonded anions.

5. The cobalt catalyst according to claim 4, wherein component I is a β-diketonate of cobalt with a β-diketonate having the formula R$^1$—CO—CR$^2$—CO—R$^3$, where R$^1$ to R$^3$ are identical or different and denote hydrogen or an alkyl group having 1 to 10 C atoms.

6. The cobalt catalyst according to claim 4, wherein component II is a β-keto acid complex of cobalt with a keto acid ester having the formula R$^1$—CO—CR$^2$—CO—O—R$^3$, where R$^1$ to R$^3$ are identical or different and denote hydrogen or an alkyl group having 1 to 10 C atoms.

7. The cobalt catalyst according to claim 4, wherein component III is Co(octanotate)$_2$ or Co(versatate)$_2$.

8. The cobalt catalyst according to claim 4, wherein component IV is CoCl$_2$-(pyridine)$_2$, CoBr$_2$-(pyridine)$_2$, CoCl$_2$—(PPh$_3$)$_2$, CoBr$_2$-(PPh$_3$)$_2$, CoCl$_2$-(vinylimidazole)$_4$ or CoCl$_2$—(EtOH).

9. The cobalt catalyst according to claim 4, wherein component V is tris-(π-allyl)-cobalt, bis-(π-allyl)cobalt chloride, bis-(π-allyl)cobalt bromide, bis-(π-allyl)-cobalt iodide, bisacrylonitrile-(π-allyl)cobalt, (1,3-butadiene)[1-(2-methyl-3-butenyl)-π-allyl]cobalt, bis-(π-1,5-cyclooctadienyl)-tert-butylisonitrile)cobalt, (π-cyclooctenyl)-(π-1,5-cyclooctadienyl) cobalt, (π-cycloheptadienyl)-(π-1,5-cyclooctadienyl)cobalt or (bicyclo[3.3.0]-octadienyl)-(π-1,5-cyclooctadienyl)-cobalt.

10. The cobalt catalyst according to claim 1, wherein component (b) has the formula $X_cAlR_d$, where X is a halogen, R is an organic alkyl group having 1 to 12 carbon atoms, and c and d, independently of each other, are 1 to 2, and where the sum of c and d is 3.

11. The cobalt catalyst according to claim 1, wherein component (b) is diethylaluminum chloride, ethylaluminium sesquichloride, ethylaluminum dibromide, diethylaluminum bromide, ethylaluminum diiodide, diethylaluminum iodide, diisobutylaluminum chloride, octylaluminium dichloride or dioctylaluminuium chloride.

12. The cobalt catalyst according to claim 1, wherein component (c) is water, an alcohol or an oxide support comprising a surface having an OH group.

13. The cobalt catalyst according to claim 12, wherein the oxide support is based on silicon dioxide or aluminum oxide.

14. The cobalt catalyst according to claim 1, wherein the inorganic solid support and/or the polymeric organic support of component (d) are particulate and have a specific surface area of >10 $m^2/g$ as determined by BET measurements and a pore volume of 0.3 to 15.

15. The cobalt catalyst according to claim 14, wherein the inorganic solid support is a silica gel, clay, aluminosilicate, talcum, zeolite, carbon black, graphite, activated carbon, inorganic oxide, inorganic salt, magnesium chloride, or a mixture thereof.

16. The cobalt catalyst according to claim 14, wherein the polymeric organic solid support is polyethylene, polypropylene, polystyrene, polybutadiene, or a mixture thereof.

17. The cobalt catalyst according to claim 1, where the inorganic support and/or the polymeric support of component (d) is a non-porous, particulate solid or a surface of a reaction vessel.

18. The cobalt catalyst according to claim 1, wherein component (e) is the tertiary phosphine having the formula $P(3-R^1-,4-R^2-,5-R^3—C_6H_2)_3$, where $R^1$ to $R^3$ are identical or different and denote hydrogen or an alkyl group having 1 to 6 C atoms, and the numerals 3, 4 and 5 preceding $R^1$, $R^2$ and $R^3$ in the formula denote the substitution position of the aromatic residue.

* * * * *

UNITED STATES PATENT AND TRADEMARK OFFICE
CERTIFICATE OF CORRECTION

PATENT NO. : 6,093,674
DATED : July 25, 2000
INVENTOR(S) : Windisch et al.

Page 1 of 2

It is certified that error appears in the above-indentified patent and that said Letters Patent is hereby corrected as shown below:

On the cover page, section [56] References Cited, OTHER PUBLICATIONS, delete "English Translation of JP 57,180,614 (Japan, Nov. 6, 1982)." On the cover page, section [57] ABSTRACT, (b) "organoaluminium" should be - -organoaluminum- -; in column 2, line 2, (b) "organoaluminium" should be - -organoaluminum- -; in column 3, line 9, "organoaluminium" should be - -organoaluminum- -; in column 3, line 11, "diethylaluminium" should be - -diethylaluminum- -; in column 3, line 11, "ethylaluminium" should be - -ethylaluminum- -; in column 3, line 12, "ethylaluminium" should be - -ethylaluminum- -; in column 3, spanning lines 12 to 13, "diethylaluminium" should be - -diethylaluminum- -; in column 3, line 13, "ethylaluminium" should be - -ethylaluminum- -; in column 13, spanning lines 13 to 14, "diethylaluminium" should be - -diethylaluminum- -; in column 3, line 14, "diisobutylaluminium" should be - -diisobutylaluminum- -; in column 3, spanning lines 14 to 15, "octylaluminium" should be - -octylaluminum- -; in column 3, line 15, "dioctylaluminium" should be - -dioctylaluminum- -; in column 3, line 67,

UNITED STATES PATENT AND TRADEMARK OFFICE
CERTIFICATE OF CORRECTION

PATENT NO. : 6,093,674
DATED : July 25, 2000
INVENTOR(S) : Windisch et al.

It is certified that error appears in the above-indentified patent and that said Letters Patent is hereby corrected as shown below:

"organoaluminium" should be - -organoaluminum- -; in column 4, line 8,

"organoaluminium" should be - -organoaluminum- -; in column 6, line 23,

"diethylaluminium" should be - -diethylaluminum- -; in column 9, line 16,

"ethylaluminium" should be - -ethylaluminum- -. In column 9, line 19 (Claim 11), "octylaluminium" should be - -octylaluminum- -; in column 9, line 20 (Claim 11), "dioctylaluminuium" should be - -dioctylaluminum- -.

Signed and Sealed this

Tenth Day of April, 2001

*Attest:*

NICHOLAS P. GODICI

*Attesting Officer*    *Acting Director of the United States Patent and Trademark Office*